(12) United States Patent
Yamaoka et al.

(10) Patent No.: US 7,544,912 B2
(45) Date of Patent: Jun. 9, 2009

(54) METHOD OF ROBOTICALLY WELDING A MOTORCYCLE FUEL TANK

(75) Inventors: Naoji Yamaoka, Saitama (JP); Yoshimasa Iwaguchi, Saitama (JP); Takashi Shimada, Utsunomiya (JP); Setsuo Arai, Utsunomiya (JP); Toshio Ishii, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 541 days.

(21) Appl. No.: 10/525,124

(22) PCT Filed: Aug. 13, 2003

(86) PCT No.: PCT/JP03/10297

§ 371 (c)(1),
(2), (4) Date: Feb. 18, 2005

(87) PCT Pub. No.: WO2004/018135

PCT Pub. Date: Mar. 4, 2004

(65) Prior Publication Data

US 2006/0151572 A1      Jul. 13, 2006

(30) Foreign Application Priority Data

Aug. 22, 2002 (JP) ............................. 2002-241528
Aug. 22, 2002 (JP) ............................. 2002-241535

(51) Int. Cl.
*B23K 9/02*  (2006.01)
*B23K 9/032* (2006.01)
*B23K 37/04* (2006.01)

(52) U.S. Cl. ................ 219/104; 219/102; 219/161; 228/212; 228/47.1

(58) Field of Classification Search ............... 219/158, 219/161, 102, 104; 228/212, 47.1
See application file for complete search history.

(56) References Cited

U.S. PATENT DOCUMENTS

| | | | |
|---|---|---|---|
| 2,867,003 A | 1/1959 | Stiles | |
| 4,491,306 A | 1/1985 | Eickhorst | |
| 4,652,719 A | 3/1987 | Fujita et al. | |
| 4,921,293 A | 5/1990 | Ruoff et al. | |

FOREIGN PATENT DOCUMENTS

| | | | |
|---|---|---|---|
| JP | 59-110182 | | 7/1984 |
| JP | 59-110182 U | * | 7/1984 |
| JP | 59-230877 | | 12/1984 |
| JP | 61-162389 | | 10/1986 |
| JP | 61-162389 U | * | 10/1986 |
| JP | 09-314351 | | 12/1997 |
| JP | 10-076985 | | 3/1998 |
| JP | 11-179554 | | 7/1999 |
| JP | 11-321752 | | 11/1999 |
| JP | 2003-048097 | | 2/2003 |

* cited by examiner

*Primary Examiner*—Kevin P Kerns
(74) *Attorney, Agent, or Firm*—Carrier, Blackman & Associates, P.C.; William D. Blackman; Joseph P. Carrier

(57) ABSTRACT

A plurality of attachments having springs hold the outer plate of a fuel tank, and an inner jig positions the inner plate. The attachments are attached to clamp arms which are opened/closed by cylinders. When the overlap portion between the outer and inner plates is welded, the thermal deformation caused by welding is accommodated by the springs. The attachments are spaced from the fuel tank in the order in which the welding point is approached.

10 Claims, 15 Drawing Sheets

METHOD OF ROBOTICALLY WELDING A MOTORCYCLE FUEL TANK

TECHNICAL FIELD

The present invention, relates to a welding method, a welding system, and a welding jig for welding a fuel tank for a motorcycle, and more particularly to a welding method, a welding system, and a welding jig for reducing the effect of thermal strain caused by welding.

BACKGROUND ART

As shown in FIG. 15 of the accompanying drawings, a fuel tank 200 for a motorcycle generally has an outer side panel 202 and an inner side panel 204 having its bottom welded to the outer side panel 202. The outer side panel 202 and the inner side panel 204 have respective ends bent downwardly into flanges 206 that are generally seam-welded.

In motorcycles, a motorcycle having a steering handle at a high position, and which is operated by a rider whose upper half body is kept substantially upright, i.e., a so-called American-type motorcycle, has its fuel tank 200 regarded as being particularly important in terms of appearance. For the fuel tank 200 to be aesthetically pleasing, the welded flanges 206 should preferably not be exposed. Furthermore, since the center of gravity of the fuel tank is displaced upwardly by the height of the flanges 206, the flanges 206 are disadvantageous with respect to efforts to lower the center of gravity of the motorcycle.

The existence of the flanges 206 also limits the capacity of the fuel tank 200.

There has been proposed a fuel tank having a structure in which flanges do not project downwardly due to seam welding, but rather are bent inwardly (see, for example, Japanese Laid-Open Patent Publication No. 10-76985). According to this proposal, however, useless space is present above the flanges, which limits the capacity of the fuel tank.

For manufacturing a flangeless fuel tank, a skilled welder is required, in order to weld the fuel tank by means of arc welding or the like. If the fuel tank is automatically welded by a robot, then since the fuel tank must be firmly secured in place, the fuel tank tends to crack since thermal strains cannot be relieved during welding, resulting in a reduced yield. In such a case, when the fuel tank cracks, it still needs to be repaired by a skilled welding operator.

DISCLOSURE OF THE INVENTION

The present invention has been made in view of the above problems. It is an object of the present invention to provide a welding method, a welding system, and a welding jig for reducing the effect of thermal strain caused by welding when a fuel tank for a motorcycle is welded, thereby preventing the fuel tank from cracking.

According to the present invention, there is provided a welding method for welding a motorcycle fuel tank, using a plurality of opening/closing mechanisms having one or more attachments, for bringing the attachments into and out of abutting engagement with the fuel tank, and comprising the steps of bringing the attachments into abutting engagement with the fuel tank with the opening/closing mechanisms, thereby holding the fuel tank, and bringing the attachments out of abutting engagement with the fuel tank with the opening/closing mechanisms in the order in which the attachments are approached by a welded spot where the fuel tank is welded, when the welded spot moves along a welding line.

When the welded spot moves along the welding line, the attachments are brought out of abutting engagement with the fuel tank in the order in which the attachments are approached by the welded spot. Therefore, the effect of thermal strain, caused by welding the fuel tank is reduced, preventing the fuel tank from cracking.

If the attachments hold the fuel tank through resilient bodies, the effect of thermal strain caused by welding the fuel tank can be reduced further, even while the attachments are kept in abutting engagement with the fuel tank.

The fuel tank may have an outer side panel having inwardly extended ends, wherein an inner side panel is welded to the outer side panel. In this case, the attachments hold the fuel tank while outer surfaces of the ends of the outer side panel and inner surfaces of ends of the inner side panel are superposed, or while the ends of the outer side panel and the ends of the inner side panel are in abutment against each other. With the fuel tank being thus held, the inner side panel and the outer side panel are accurately positioned. Therefore, the welded fuel tank can have a shape that is free of flanges.

The attachments are brought out of abutting engagement with the fuel tank by the opening/closing mechanisms when the welded spot reaches a point which is spaced 20 mm or less from a reference point on the welding line which is closest to an abutment point where each of the attachments and the fuel tank abut against each other.

According to the present invention, there is also provided a welding system for welding a motorcycle fuel tank, which has an outer side panel having inwardly extended ends, and an inner side panel welded to the outer side panel, comprising a plurality of opening/closing mechanisms having one or more attachments, the opening/closing mechanisms bringing the attachments into and out of abutting engagement with the fuel tank, a welding machine automatically operable for welding the fuel tank, and a controller connected to the opening/closing mechanisms and the welding machine, wherein the controller controls the opening/closing mechanisms to bring the attachments into abutting engagement with the fuel tank to hold the fuel tank, and thereafter, the controller determines the position of a welded spot where the fuel tank is welded by the welding machine and the positions of the attachments, and if the relative position of the welded spot with respect to each of the attachments satisfies a predetermined standard, the controller controls at least one of the opening/closing mechanisms to bring the attachments out of abutting engagement with the fuel tank.

According to the present invention, there is further provided a welding jig for holding a motorcycle fuel tank when the fuel tank is welded, comprising a plurality of attachments for holding the fuel tank through resilient bodies.

Since the attachments hold the fuel tank through resilient bodies, the effect of thermal strain caused by welding the fuel tank can be reduced, thereby preventing the fuel tank from cracking.

The attachments are mounted on respective arms having respective opening/closing mechanisms. When the arms are fully opened, they are opened wide enough to allow the fuel tank to be attached and detached. When the arms are fully closed, the arms are positioned by respective stoppers to hold the fuel tank with the attachments.

With the above arrangement, the fuel tank can easily be attached to and detached from the welding jig, with the attachments being positioned accurately by the stoppers.

The attachments have pressing force adjusters for adjusting a pressing force with which the fuel tank is held. The pressing force adjusters are capable of adjusting the pressing force with which the attachments contact the fuel tank, thereby adjusting the allowable amount of thermal strain caused by welding the fuel tank.

The welding jig may further comprise an outer jig for supporting an outer side panel of the fuel tank, and an inner jig for supporting an inner side panel of the fuel tank, wherein the attachments are provided in the outer jig, and hold side portions and/or end portions of the outer side panel. With this arrangement, the inner and outer side panels of the fuel tank are held and accurately positioned respectively by the inner and outer jigs.

The outer side panel of the fuel tank has inwardly extended ends, wherein the attachments hold the fuel tank while outer surfaces of ends of the outer side panel and inner surfaces of ends of the inner side panel are superposed, or while the ends of the outer side panel and the ends of the inner side panel are in abutment against each other. When the outer side panel and the inner side panel are held in this manner, the fuel tank may be of a shape that is free of flanges.

The welding jig may further comprise a positioning mechanism, which is inserted into a fuel inlet defined in an upper surface of the fuel tank, for contacting the inner portion of the fuel tank to hold the fuel tank. The positioning mechanism allows the fuel tank to be quickly and accurately positioned with respect to the welding jig.

Each of the attachments has a distal end abutting against the fuel tank, wherein the distal end has a tilting mechanism tiltable in any direction.

BEST MODE FOR CARRYING OUT THE INVENTION

An embodiment of the present invention will be described below with reference to FIGS. 1 through 14. A welding method, a welding system 10, and a welding jig 10a according to the embodiment serve to weld a fuel tank 12 for a motorcycle.

Figure 1:
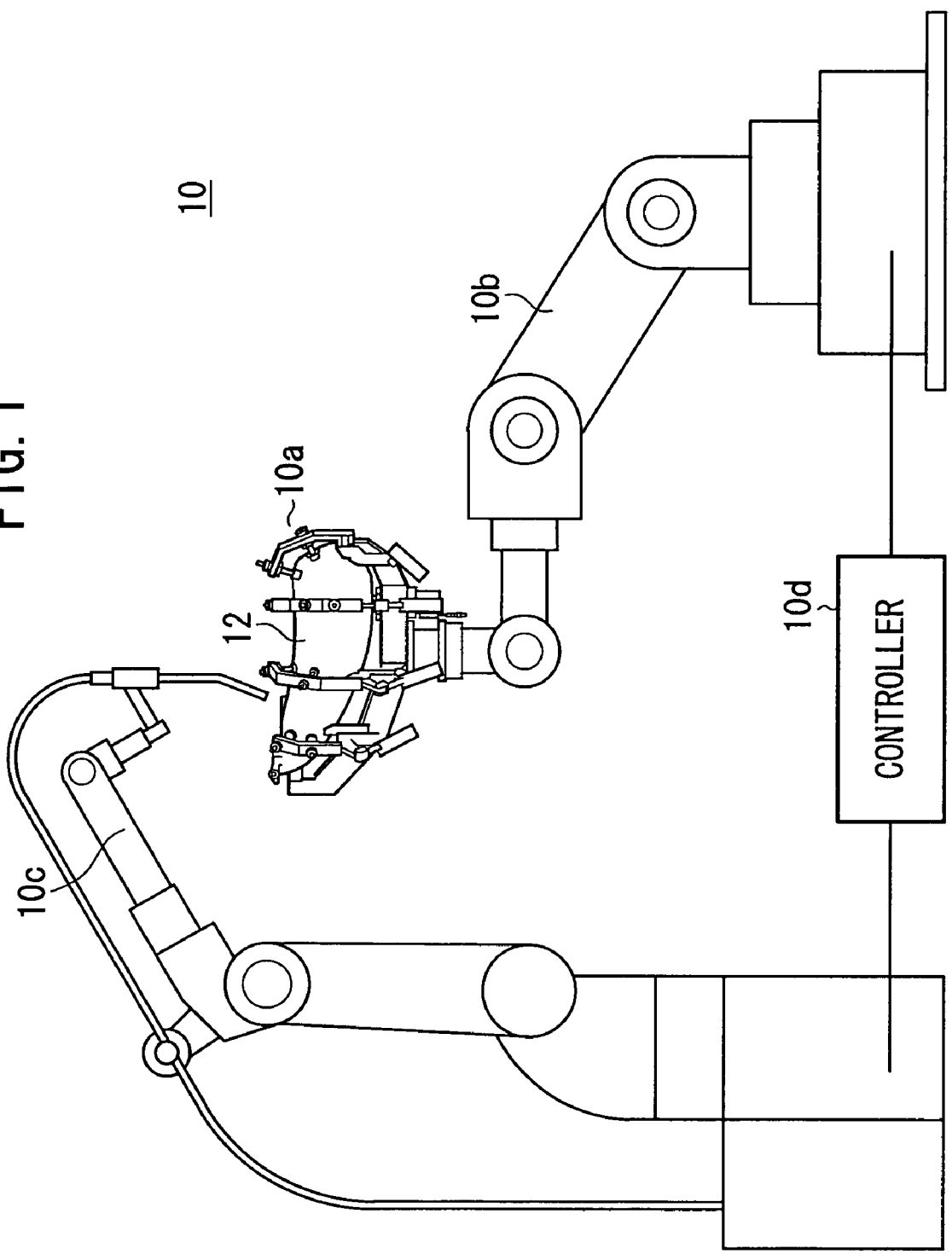
FIG. 1 is a schematic view of a welding system according to an embodiment of the present invention.

As shown in FIG. 1, the welding system 10 has a welding jig 10a (see FIG. 2) for holding the fuel tank 12, a jig robot 10b for setting the fuel tank 12 held by the welding jig 10a at a predetermined position, a welding robot (welding machine) 10c for performing a welding process, and a controller 10d. The controller 10d is connected to cylinders 28 (see FIG. 2) of the welding jig 10a, a positioning mechanism 44 (see FIG. 7), the jig robot 10b, and the welding robot 10c, for controlling the welding system 10 in its entirety.

Figure 2:
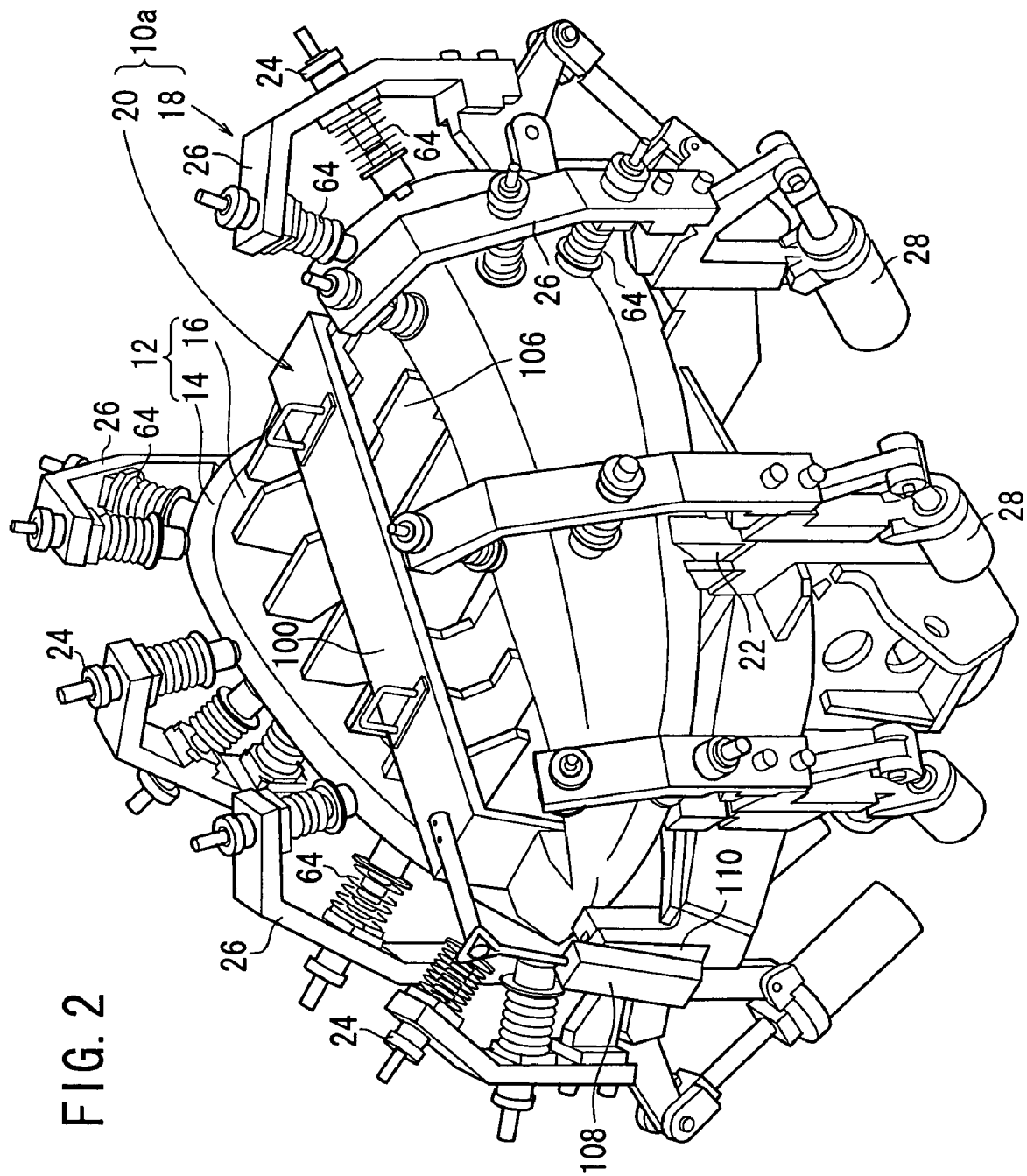
FIG. 2 is a perspective view of a welding jig according to the embodiment of the present invention together with a motorcycle fuel tank.

As shown in FIG. 2, the welding jig 10a is a jig for fixing an outer side panel 14 and an inner side panel 16 of the motorcycle fuel tank 12 when the outer side panel 14 and the inner side panel 16 are welded to each other. The welding jig 10a has an outer jig 18 for supporting the outer side panel 14 and an inner jig 20 for supporting the inner side panel 16. As shown in FIG. 2, the fuel tank 12 has its right side positioned forwardly (closer to the steering handle of the motorcycle) and its left side positioned rearwardly (closer to the seat of the motorcycle).

The outer jig 18 is mounted on the tip end of the jig robot lob (see FIG. 1) and is set at a predetermined position for the welding process. The welding process is performed by the welding robot 10c. The jig robot 10b, the welding robot 10c, the cylinder 28, and so forth, are controlled by the controller 10d.

The outer side panel 14 of the fuel tank 12 has a lower portion in FIG. 2 supported by a plurality of lower supports 22 and side and end portions supported by a plurality of attachments 24. Each group of two or three of the attachments 24 is mounted on a single clamp arm (arm) 26. There are a total of eight clamp arms 26, four in each of left and right symmetrical arrays, which are individually openable and closable by cylinders 28.

Figure 3:
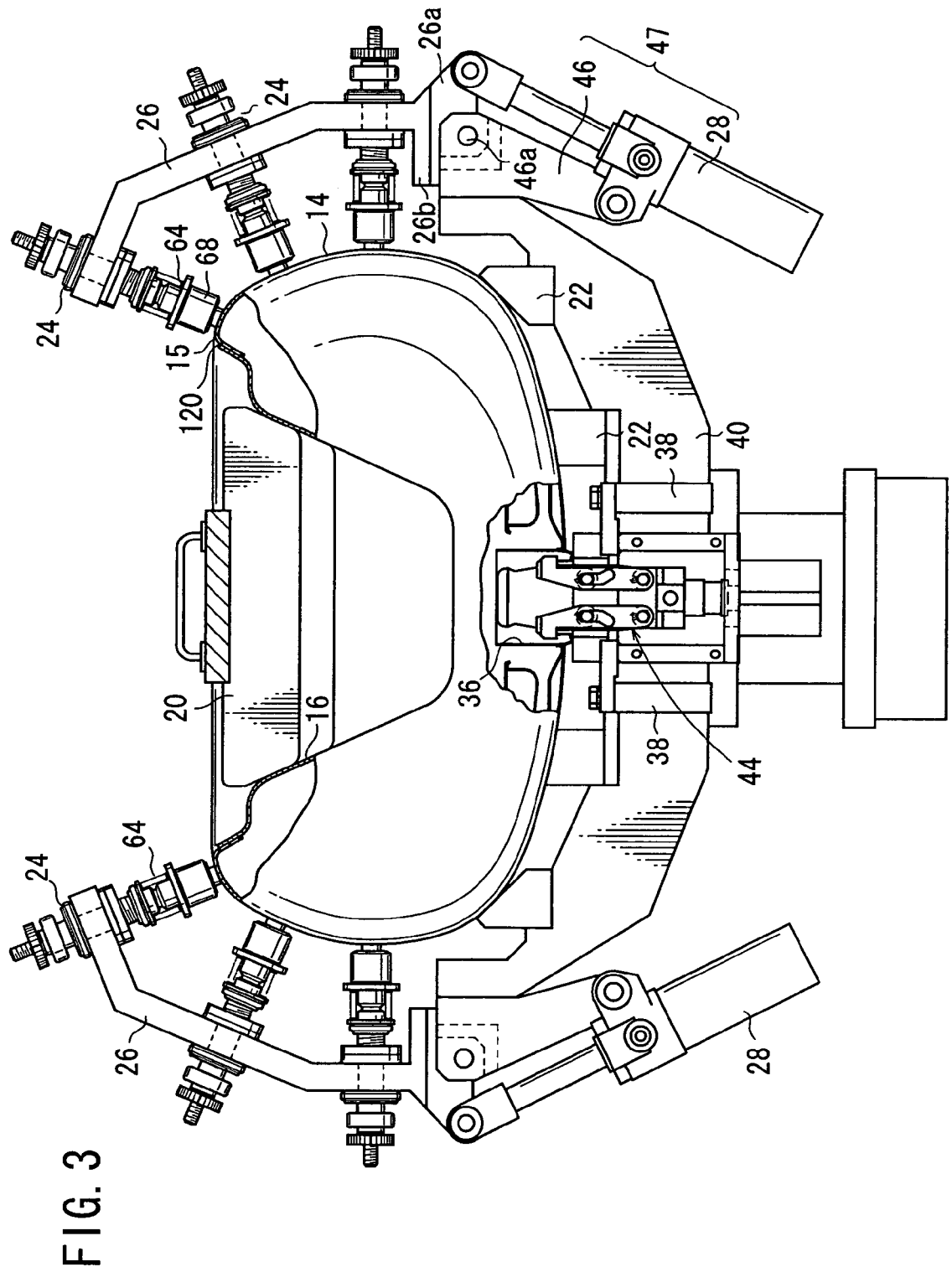
FIG. 3 is a front elevational view, partly in cross section, of the welding jig according to the embodiment of the present invention together with the motorcycle fuel tank.
Figure 4:
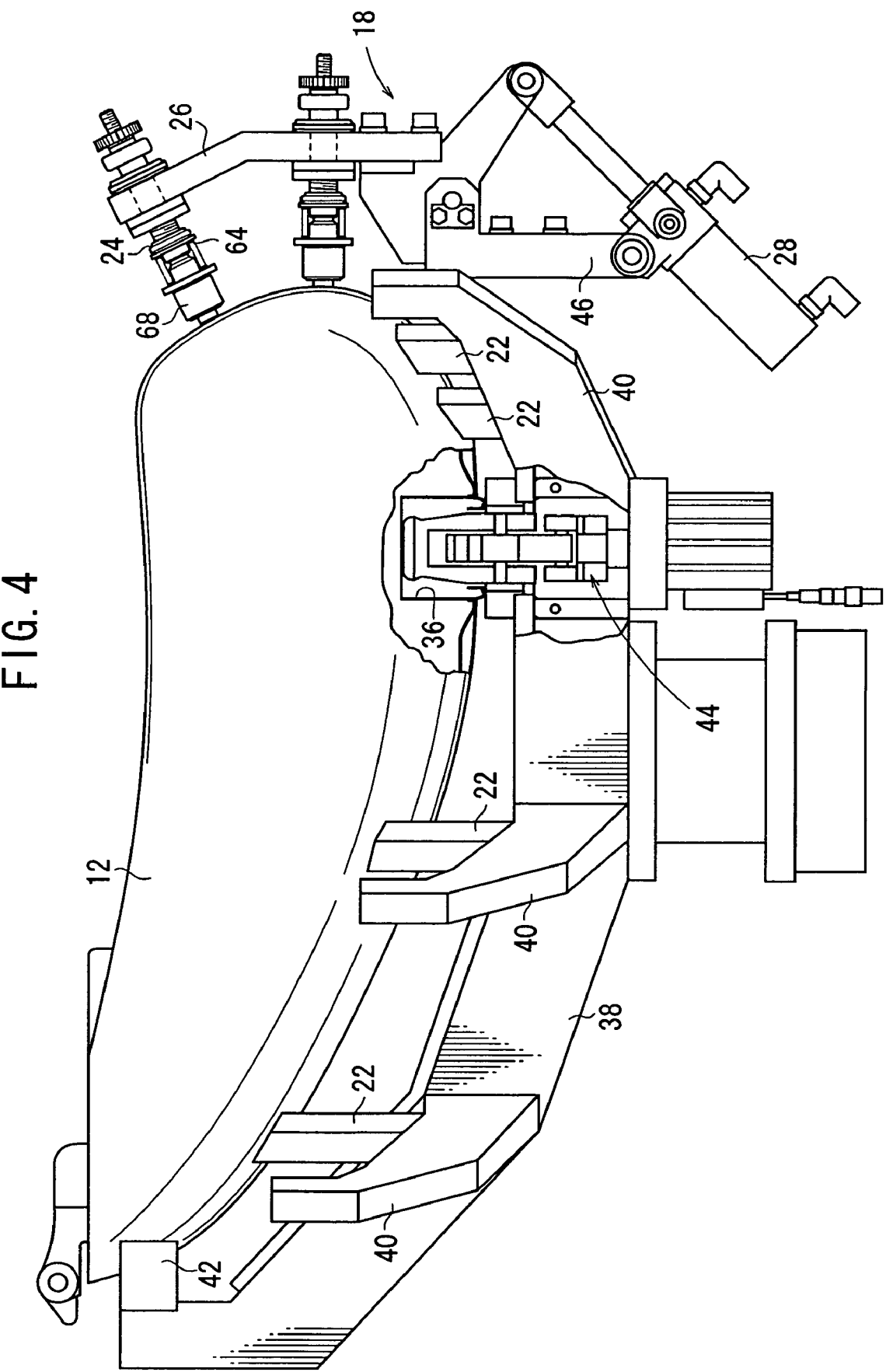
FIG. 4 is a side elevational view, partly omitted from illustration, of the welding jig according to the embodiment of the present invention together with the motorcycle fuel tank.

As shown in FIGS. 3 and 4, the outer side panel 14 has ends 15 extended inwardly, and the inner side panel 16 has ends whose inner surfaces are superposed on the outer surfaces of the ends of the outer side panel 14. A contact region 120 (see FIG. 13) where the ends of the outer side panel 14 and the inner side panel 16 are superposed is welded by the welding robot 10c, thereby performing one-side welding of a fillet joint. The fuel tank has a fuel inlet 36 disposed in a lower portion of the outer side panel 14.

The outer jig 18 has two vertical frames 38 extending rearwardly from a position substantially beneath the fuel inlet 36, at a substantially constant spaced interval from the lower surface of the outer side panel 14, and four auxiliary frames 40 extending laterally, obliquely forwardly, and obliquely rearwardly, on each of left and right sides thereof. A plurality of lower supports 22 for supporting the outer side panel 14 from below are mounted on the upper surfaces of the auxiliary frames 40. Rear end support members 42 for supporting lateral sides of the rear end of the outer side panel 14 are mounted on the rear ends of the vertical frames 38. The lower supports 22 and the rear end support members 42 may be made of a synthetic resin, such as nylon or the like.

A positioning mechanism 44, which is inserted into the fuel inlet 36 for supporting the fuel tank 12 from inside thereof, is mounted on the front ends of the two vertical frames 38.

Figure 5:
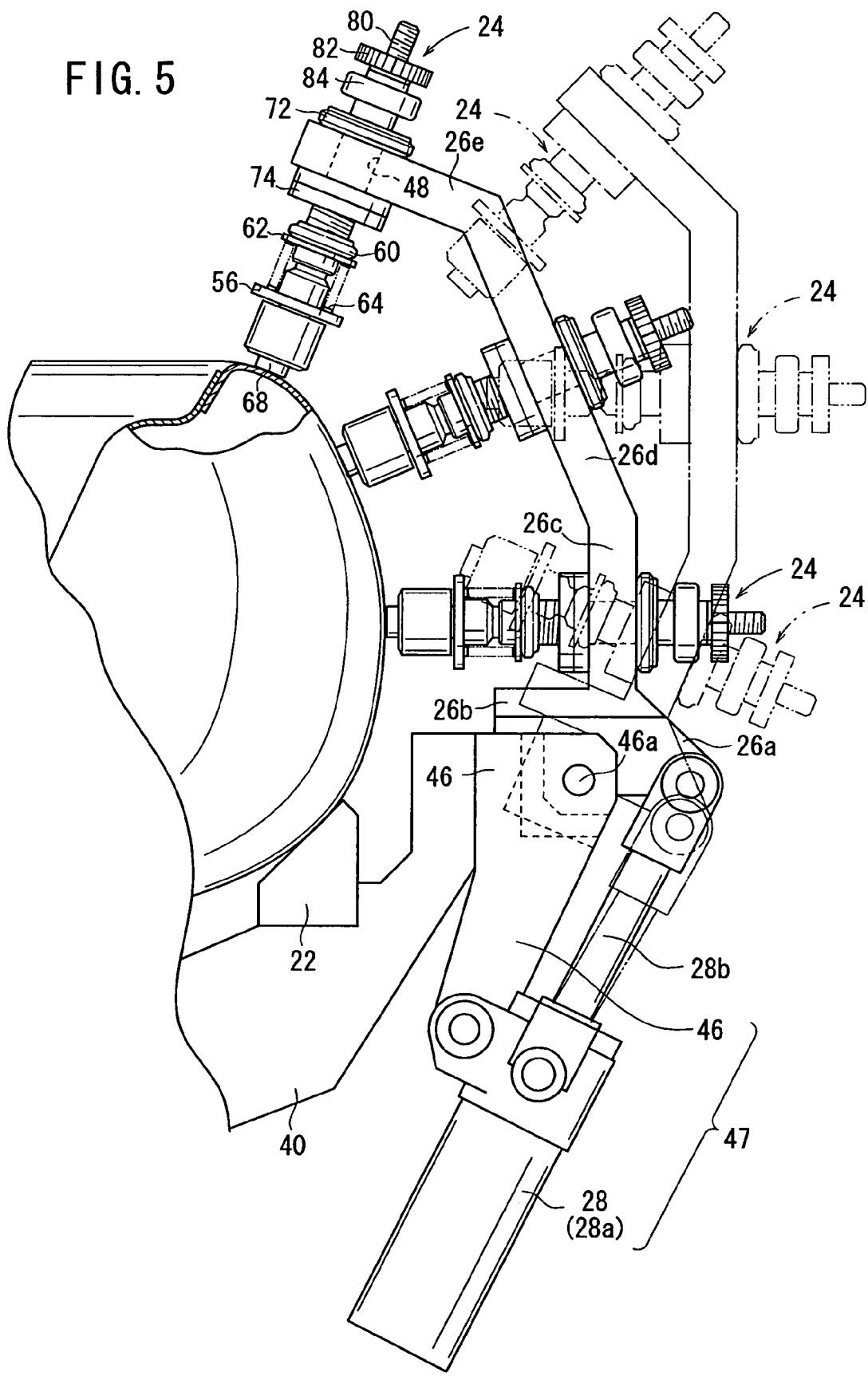
FIG. 5 is a front elevational view of a cylinder, a clamp arm, attachments, and surrounding parts.

As shown in FIG. 5, a base plate 46 and one of the cylinders 28 for opening and closing the clamp arms 26 are mounted on the distal end of each of the auxiliary frames 40. The base plate 46 and the cylinder 28 make up an opening/closing mechanism 47. The cylinder 28 has a cylinder tube 28a supported by a shaft on the base plate 46 for swinging movement. The cylinder 28 extends and contracts a rod 28*b* to open and close the clamp arm 26.

The clamp arm 26 has a lower portion supported for swinging movement on an upper shaft 46*a* on the base plate 46. The clamp arm 26 has a protrusion 26*a* projecting slightly outwardly from the lower portion thereof and supported by a shaft on the distal end of the rod 28*b* of the cylinder 28. The clamp arm 26 also has a stopper 26*b* projecting slightly inwardly from the lower portion thereof. When the clamp arm 26 is closed, the stopper 26*b* abuts against an upper surface of the base plate 46, thereby positioning the clamp arm 26.

The clamp arm 26, when it is closed by the opening/closing mechanism 47, has a first arm member 26*c* extending upwardly from the shaft 46*a*, a second arm member 26*d* mounted on the distal end of the first arm member 26*c* and inclined slightly inwardly, and a third arm member 26*e* mounted on the distal end of the second arm member 26*d* and inclined more inwardly than the second arm member 26*d*. With this structure, when the clamp arm 26 is closed, the clamp arm 26 is spaced at a substantially constant interval from the outer side panel 14. The third arm member 26*e* may be dispensed with, depending on the location (see FIG. 4).

The first arm member 26*c*, the second arm member 26*d*, and the third arm member 26*e* have respective holes 48 defined therein for installing respective attachments 24. Two or three attachments 24 are mounted on each clamp arm 26.

Figure 6:
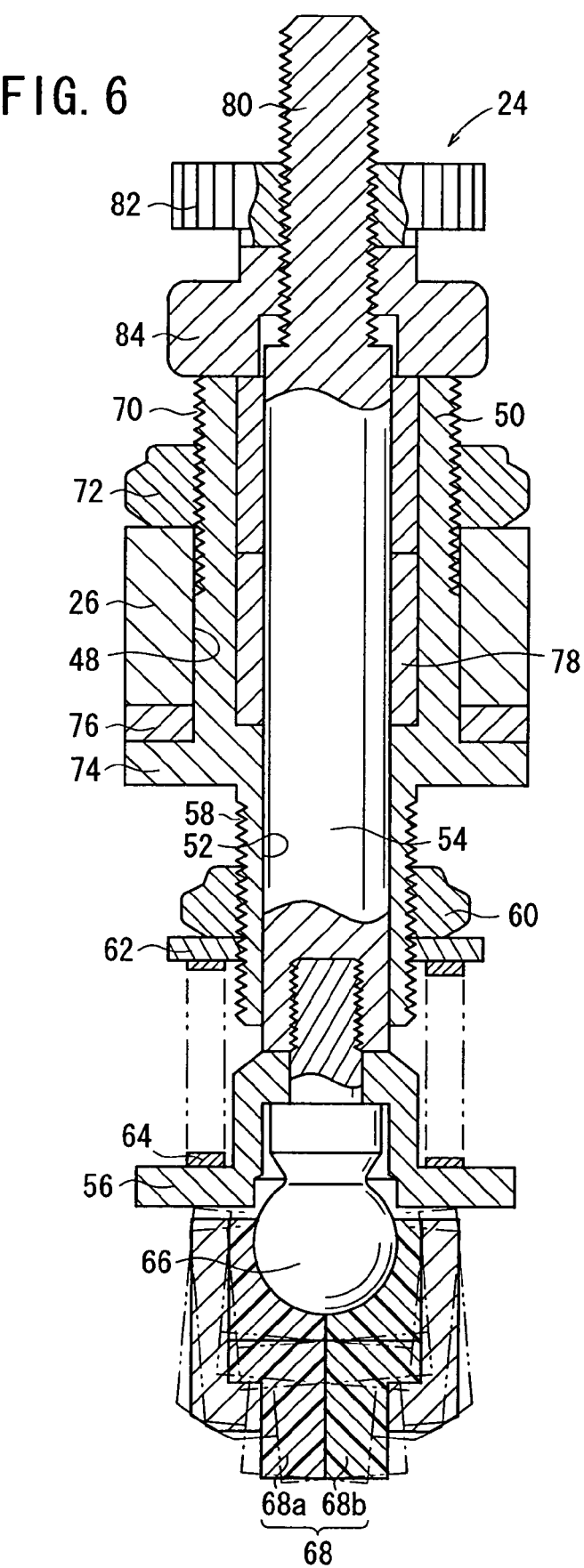
FIG. 6 is a cross-sectional view of an attachment.

As shown in FIG. 6, each of the attachments 24 comprises a sleeve 50 mounted in a hole 48 in the clamp arm 26, an attachment shaft 54 movable in and along a central bore 52 of the sleeve 50, a spring bearing plate 56 mounted on the distal end of the attachment shaft 54, an adjustment nut 60 (pressing force adjuster) threaded over screw threads 58 which are formed on the outer circumferential surface of the distal end of the sleeve 50, a washer 62 held against the adjustment nut 60, and a spring (resilient body) 64 disposed between the spring bearing plate 56 and the washer 62.

A ball 66, and an abutment (tilting mechanism) 68, which is tiltable in any direction while being held in sliding contact with the ball 66, are mounted on the distal end of the spring bearing plate 56. The abutment 68 comprises two components 68*a*, 68*b* sandwiching the ball 66 therebetween.

A fixing nut 72 is threaded over screw threads 70 that are formed on the outer circumferential surface of the rear end of the sleeve 50. The clamp arm 26 is clamped in position between an annular flange 74, which is mounted substantially centrally on the sleeve 50 and the fixing nut 72. One or more annular shims 76, for adjusting the length by which the attachment 24 projects with respect to the clamp arm 26 when necessary, are inserted between the annular flange 74 and the clamp arm 26.

A cylindrical bushing 78 having a lubricating function is inserted in the bore of the sleeve 50. The attachment shaft 54 is smoothly movable with respect to the bushing 78.

The attachment shaft 54 has a smaller diameter externally threaded portion 80 formed on the rear portion thereof, wherein a knob 82 (pressing force adjuster) and an end stopper 84 (pressing force adjuster) are threaded over the externally threaded portion 80. When the knob 82 and the end stopper 84 are turned, the compression of the spring 64 and the projection of the attachment shaft 54 can be adjusted. After such an adjustment, the knob 82 and the end stopper 84 are fixed in position as double nuts that are tightened against each other.

When the adjustment nut 60 is turned, the compression of the spring 64 can be adjusted. Specifically, the degree of compression of the spring 64 is adjustable by means of the knob 82, the end stopper 84, and the adjustment nut 60. Actually, knob 82 and the end stopper 84 are turned to roughly adjust the compression of the spring 64, and the adjustment nut 60 is turned to finely adjust the compression of the spring 64.

When the distal end of the abutment 68 is pushed by the outer side panel 14, the attachment shaft 54 is moved toward the rear end thereof. At this time, the attachment shaft 54 compresses the spring 64, and moves a certain distance depending on the repulsive force of the spring 64.

Figure 7:
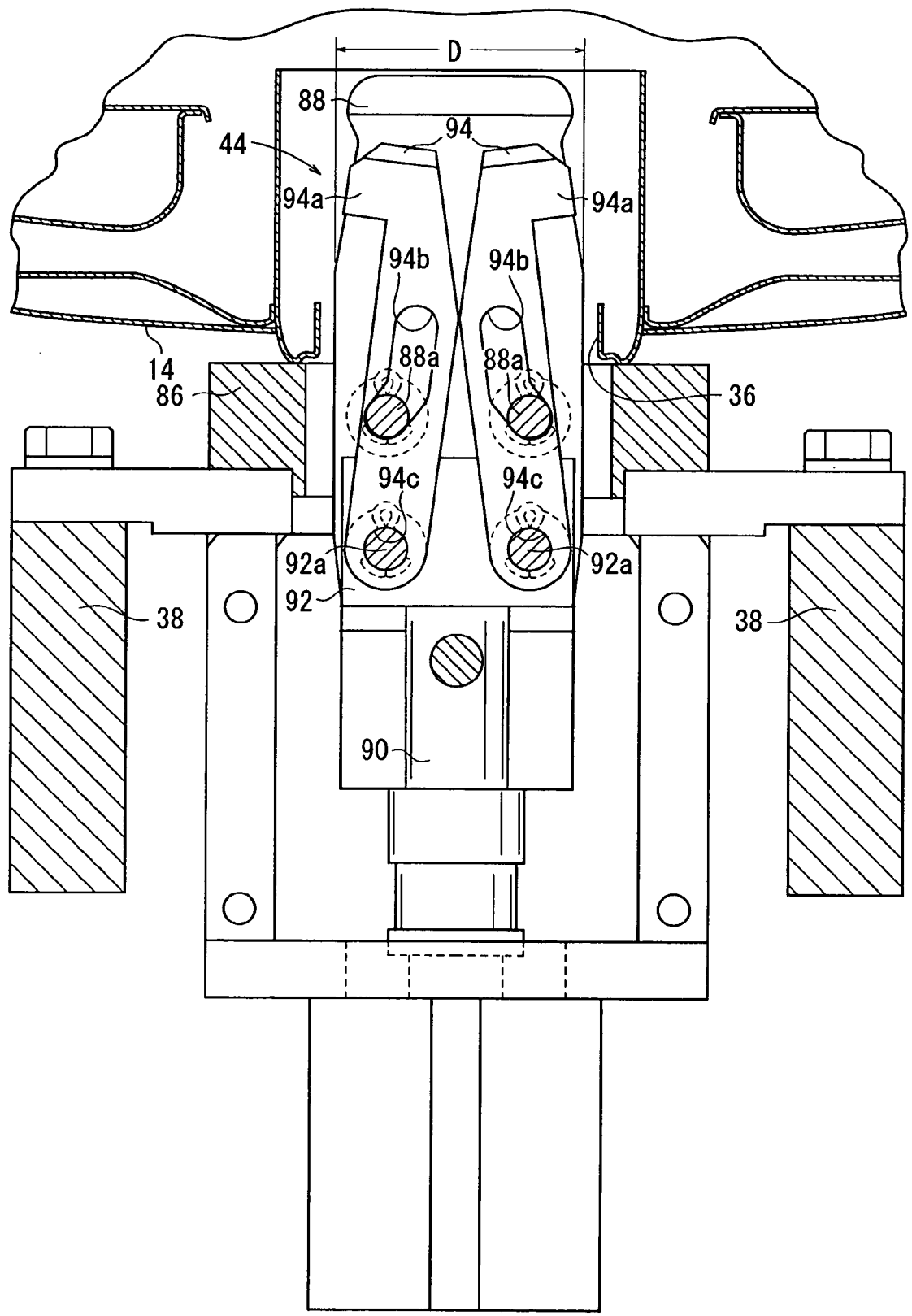
FIG. 7 is a front elevational view of a positioning mechanism in a condition in which hooks thereof are elevated.

As shown in FIG. 7, the positioning mechanism 44 is disposed beneath the fuel inlet 36, at an intermediate location between the two vertical frames 38. The positioning mechanism 44 has an upper portion inserted in the fuel inlet 36. The positioning mechanism 44 has an insert member 88 fixed to a frame body 86, a movable member 92 vertically movable by a rod 90, and two hooks 94 supported by shafts on the movable member 92 for being tiltable slightly outwardly when the movable member 92 is lowered. The insert member 88 has a horizontal width D, which is slightly smaller than the inside diameter of the fuel inlet 36.

The two hooks 94 comprise upwardly extending plates shaped bilaterally symmetrically. Each of the hooks 94 has an upper tooth 94*a* projecting slightly outwardly, a longitudinally oblong hole 94*b*, and a lower swing hole 94*c*. The oblong hole 94*b* has a lower portion bent slightly outwardly.

Two bilaterally symmetrical fixed support shafts 88*a* project from the insert member 88 at a substantially central height thereof. Two bilaterally symmetrical movable support shafts 92*a* project from an upper portion of the movable member 92. As shown in FIG. 7, the fixed support shafts 88*a* and the movable support shafts 92*a* project toward the direction of the viewer. The fixed support shafts 88*a* are inserted in the oblong holes 94*b* defined in the hooks 94, and the movable support shafts 92*a* are fitted in the swing holes 94*c* defined in the hooks 94.

For placing the outer side panel 14 on the outer jig 18, the rod 90 is moved upwardly by a cylinder (not shown). At this time, the two hooks 94 are tilted inwardly and positioned within the horizontal width D of the insert member 88. When the outer side panel 14 is placed on the outer jig 18, an upper portion of the insert member 88 and upper portions of the hooks 94 are inserted into the fuel inlet 36.

Figure 8:
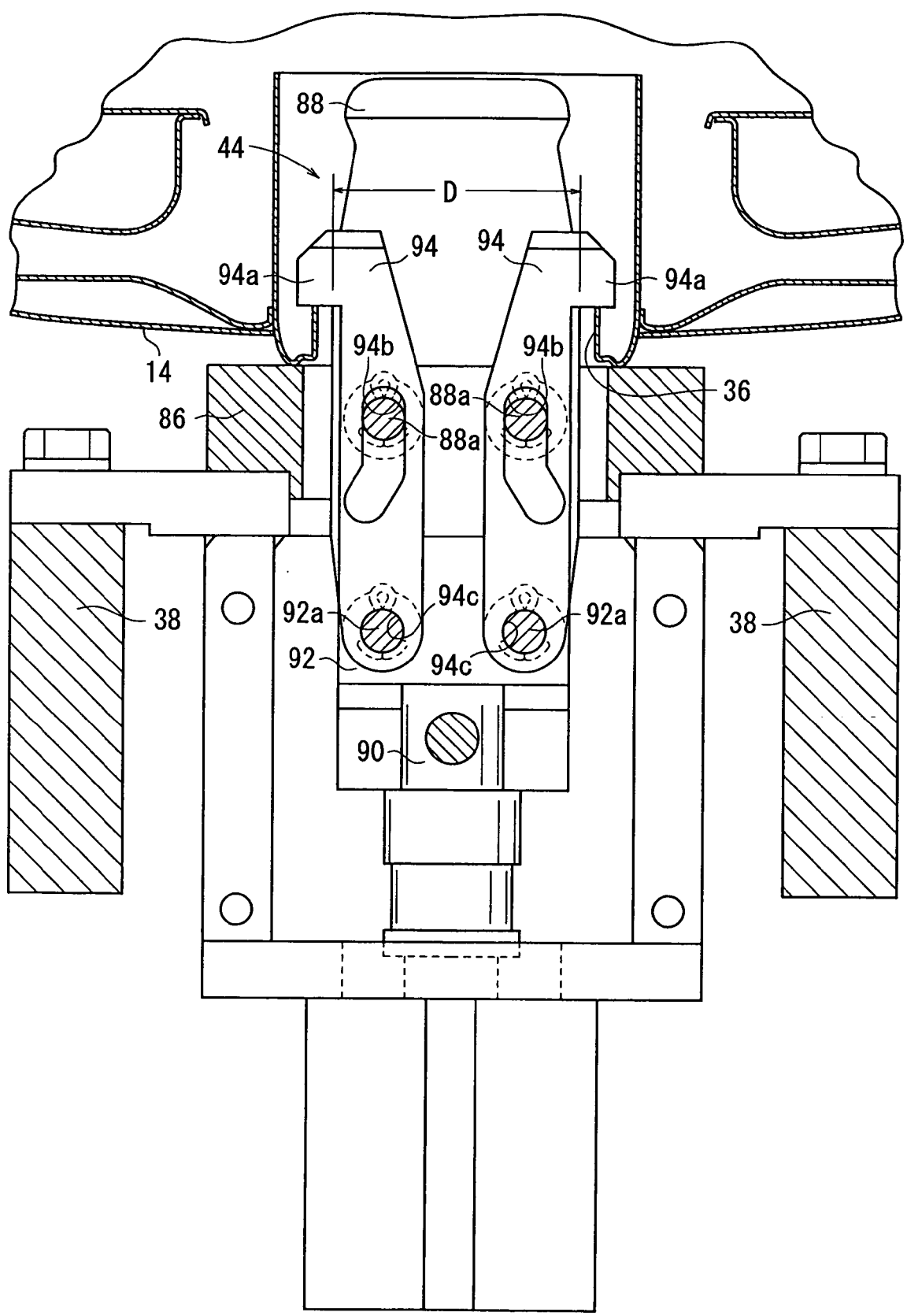
FIG. 8 is a front elevational view of the positioning mechanism when the hooks thereof are lowered.

As shown in FIG. 8, when the rod 90 is lowered, the movable member 92 and the hooks 94 are also lowered. The hooks 94 are guided by the fixed support shafts 88*a* that are inserted in the oblong holes 94*b*, and are tilted outwardly. The teeth 94*a* of the hooks 94 project beyond the inside diameter of the fuel inlet 36. Upon further descent of the hooks 94, the teeth 94*a* of the hooks 94 abut against an end of the fuel inlet 36, thus holding the outer side panel 14.

Figure 9:
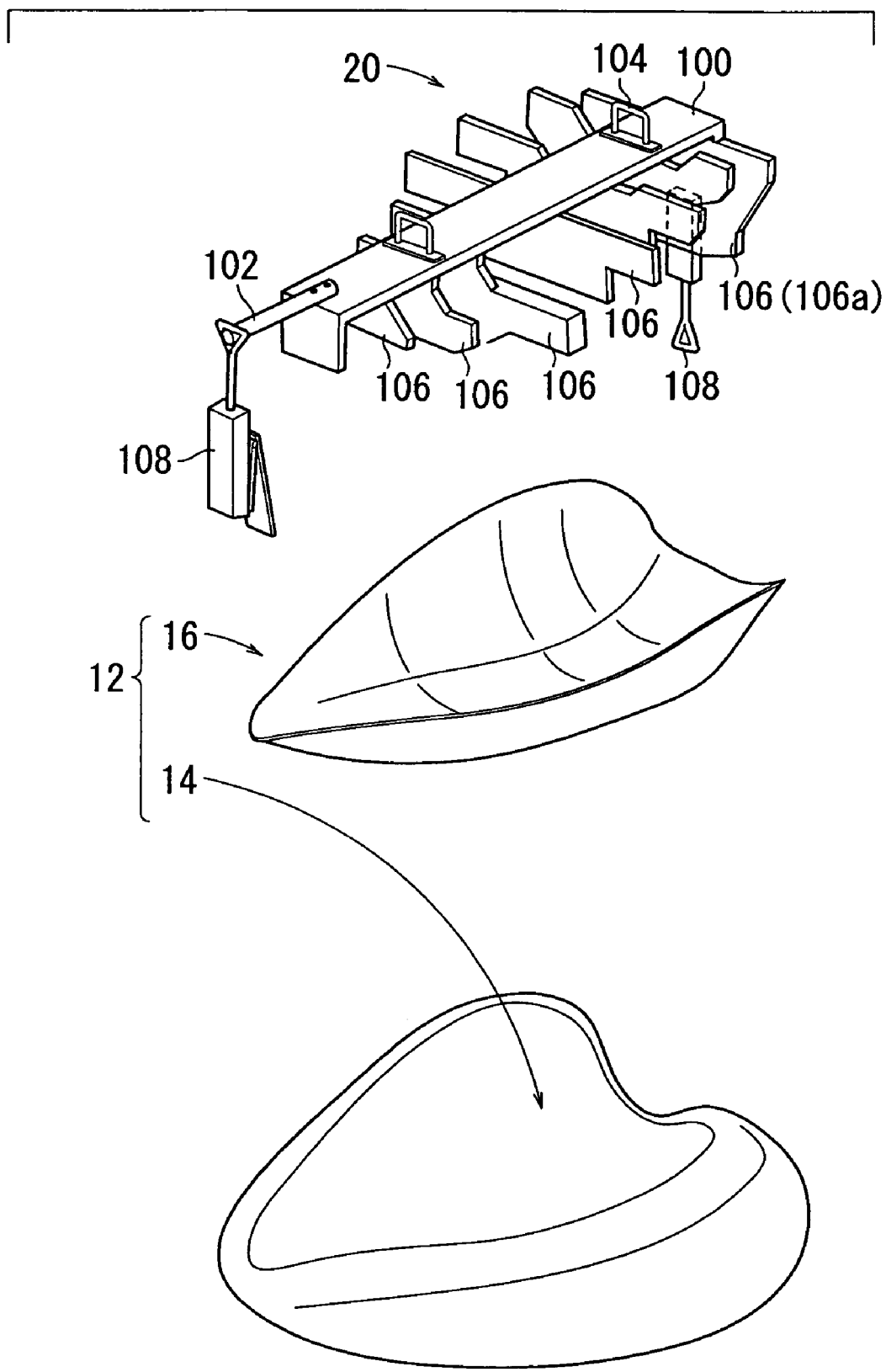
FIG. 9 is a perspective view of an inner jig, an inner side panel, and an outer side panel.

As shown in FIG. 9, the inner jig 20 has an elongate upper plate 100, an extension rod 102 projecting from a rear end of the upper plate 100, grips 104 mounted on an upper surface of the upper plate 100, and a plurality of nylon presser plates 106 fixed to a lower surface of the upper plate 100 and matching the shape of the inner side panel 16. Joint levers 108 are mounted respectively on a rear end of the extension rod 102 and on the foremost one 106*a* of the presser plates 106. Each of the presser plates 106 is of a bilaterally symmetrical shape, projecting from the upper plate 100 at its center, and has lateral end surfaces or a lower surface matching the shape of the inner side panel 16. The joint levers 108 respectively engage with joint hooks 110 (see FIG. 2), which are mounted on front and rear ends of the outer jig 18.

Figure 10:
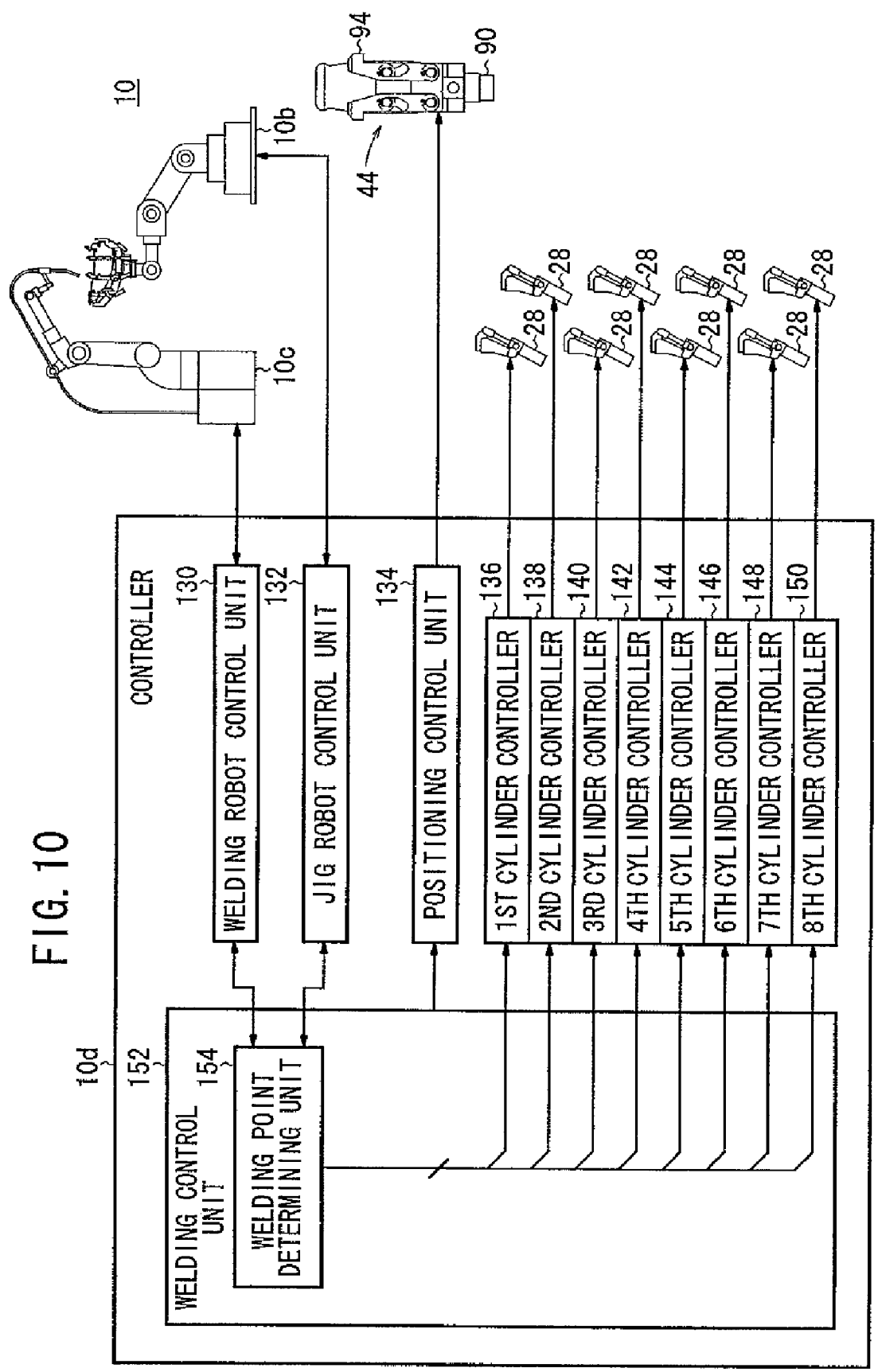
FIG. 10 is a block diagram of a controller.

As shown in FIG. 10, the controller 10*d* has a welding robot control unit 130 for controlling the welding robot 10*c*, a jig robot control unit 132 for controlling the jig robot 10b, a positioning control unit 134 for vertically moving the rod 90 of the positioning mechanism 44, and first through eighth cylinder control units 136, 138, 140, 142, 144, 146, 148, 150 for controlling the eight cylinders 28, respectively. The welding robot control unit 130 and the jig robot control unit 132 control respective motor drivers, not shown, which operate the welding robot 10c and the jig robot 10b. The welding robot control unit 130 and the jig robot control unit 132 can detect attitudes of the welding robot 10c and the jig robot 10b, as well as the positions and speeds of various parts thereof, through feedback signals. Pneumatic valves, not shown, are disposed between the positioning control unit 134 and the positioning mechanism 44, and also between the first through eighth cylinder control units 136 through 150 and the cylinders 28, wherein such valves function to operate the rod 90 and the cylinders 28.

The controller 10d also has a welding control unit 152 as a main control unit, including a welding point determining unit 154 for transferring data to and from the welding robot control unit 130 and the jig robot control unit 132. The welding point determining unit 154 gives control instructions to the first through eighth cylinder control units 136 through 150.

A process of welding the outer side panel 14 and the inner side panel 16 of the fuel tank 12 using the welding system 10 and the welding jig 10a will be described below with reference to FIGS. 11 through 14. The procedure to be described below basically is performed by the controller 10d, with certain setting operations being carried out by the operator.

Figure 12:
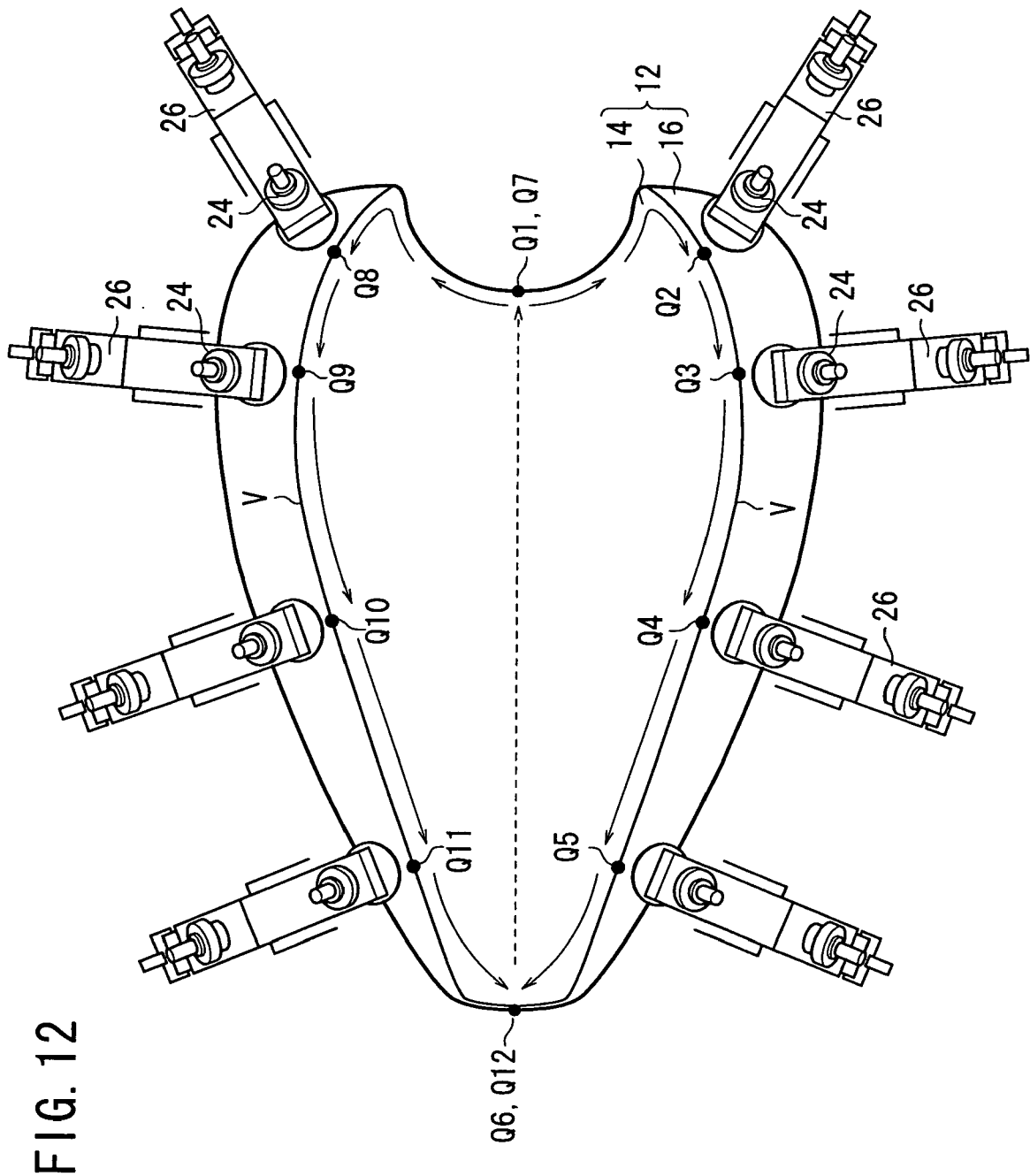
FIG. 12 is a schematic view showing a welding path.

Two welding cycles are performed on left and right sides, as indicated by points Q1 through Q6, and Q7 through Q12, which as shown in FIG. 12, represent a welding sequence. The points Q1 through Q12 are points on welding lines V. Point Q1 is a starting point, point Q6 a pausing point, point Q7 a resuming point, and point Q12 an ending point. Points Q2 through Q6 and points Q8 through Q11 are reference points on the welding lines V, which are closest to abutment points P (see FIGS. 13 and 14) where the attachments 24 on the clamp arms 26 disposed closely to those points and the fuel tank 12 abut against each other.

The welding process is started from the foremost point Q1 on the central line of the fuel tank 12, and is performed progressively through points Q2 to Q6. Point Q6 is the rearmost point on the central line of the fuel tank 12. After the welding process has been performed up to point Q6, the welding process is interrupted and then goes to point Q7. Point Q7 is a point near point Q1 and is set at a location where lap welding can be performed. The welding process is started again from point Q7, and is performed progressively through points Q7 to Q12. Point Q12 is a point near point Q7 and is set at a location where lap welding can be performed. The welding process is carried out along the above path by the welding robot 10c (see FIG. 1), and may be performed in cooperation with the jig robot 10b (see FIG. 1).

Figure 11:
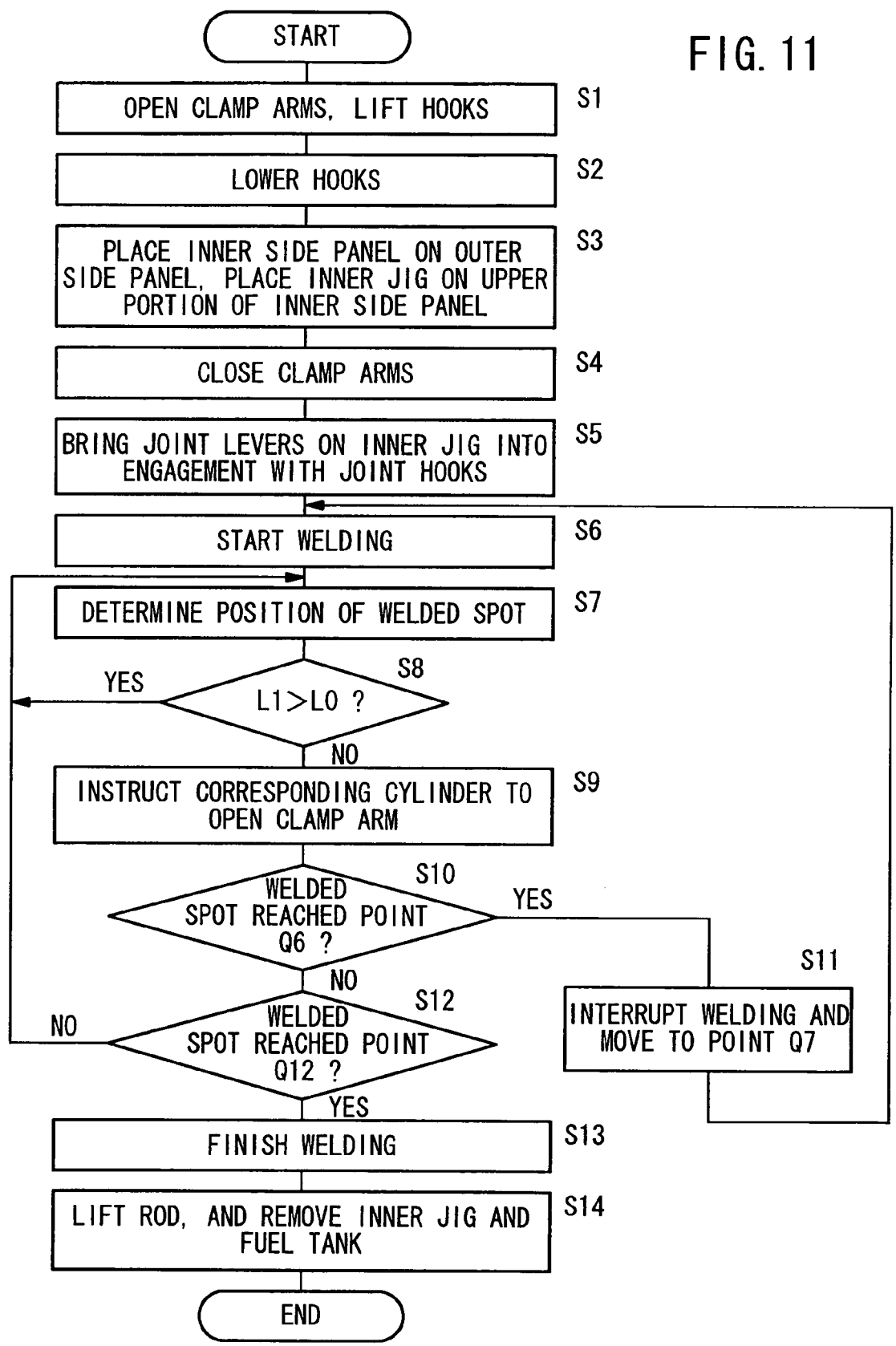
FIG. 11 is a flowchart of a welding process performed using the welding system according to the embodiment of the present invention.

Specifically, in step S1 shown in FIG. 11, the clamp arms 26 of the outer jig 18 are opened (see FIG. 5), and the rod 90 (see FIG. 7) and the hooks 94 are lifted. Then, the operator places the outer side panel 14 of the fuel tank 12 on the lower supports 22 with the fuel inlet 36 oriented downwardly. At this time, the outer side panel 14 is placed on the lower supports 22, while the insert member 88 of the positioning mechanism 44 is inserted into the fuel inlet 36. Since the hooks 94, as they are lifted, are set to a width smaller than the inside diameter of the fuel inlet 36, the hooks 94 are kept out of interference with the fuel inlet 36. Inasmuch as the horizontal width D of the insert member 88 is slightly smaller than the inside diameter of the fuel inlet 36, the upper portion of the insert member 88 can be inserted into the fuel inlet 36, thereby simply and accurately positioning the outer side panel 14 with respect to the outer jig 18.

In step S2, the rod 90 of the positioning mechanism 44 is lowered, thereby lowering the movable member 92 and the two hooks 94 (see FIG. 8). As the two hooks 94 are lowered, they are tilted outwardly until the teeth 94a abut against the end of the fuel inlet 36. The outer side panel 14 is now firmly secured with respect to the outer jig 18.

In step S3, the inner side panel 16 of the fuel tank 12 is placed on an upper portion of the outer side panel 14. At this time, the inner side panel 16 is placed on the upper portion of the outer side panel 14, such that the inwardly extended ends 15 of the outer side panel 14 and the peripheral ends of the inner side panel 16 are substantially superposed on each other. Thereafter, the inner jig 20 is placed on an upper portion of the inner side panel 16.

In step S4, the eight cylinders 28 are actuated to close the clamp arms 26, until the stoppers 26b are brought into abutment against the upper surfaces of the base plates 46. When the clamp arms 26 are closed, the abutments 68, which serve as distal ends of the respective attachments 24, abut against the outer side panel 14. At this time, the abutments 68 abut against the outer side panel 14 while compressing the springs 64, and the outer side panel 14 is pressed under a pressing force depending on the degree of compression of the springs 64. The pressing force can be adjusted when the adjustment nuts 60 or the knobs 82 are turned, and therefore may be adjusted to an appropriate level in advance by an operator.

When the abutments 68 of the attachments 24 hold the outer side panel 14, the outer side panel 14 is set in position, and hence a flexed state that would otherwise occur due to gravity can be corrected. Since the eight clamp arms 26 are disposed four each, in left and right symmetrical arrays, they hold the fuel tank 12 in a well balanced state.

Because the abutments 68 have a structure that permits tilting about the balls 66, the distal end faces of the abutments 68 are not held in localized abutment, but rather are reliably held in full abutment against the outer side panel 14.

In step S5, the operator brings the joint levers 108 on the opposite ends of the inner jig 20 into engagement with the joint hooks 110. Since the presser plates 106 have shapes that match the inner side panel 16, the inner side panel 16 is accurately positioned and fixed with respect to the outer side panel 14.

In step S6, the welding robot 10c commences a welding operation, for welding the outer side panel 14 and the inner side panel 16 to each other (see FIG. 1). The welding process is continuously performed along the welding line V (see FIG. 14), and may be one of various welding processes including TIG (inert-gas tungsten-arc welding), MIG (inert-gas metal-arc welding), laser beam welding, etc.

Figure 13:
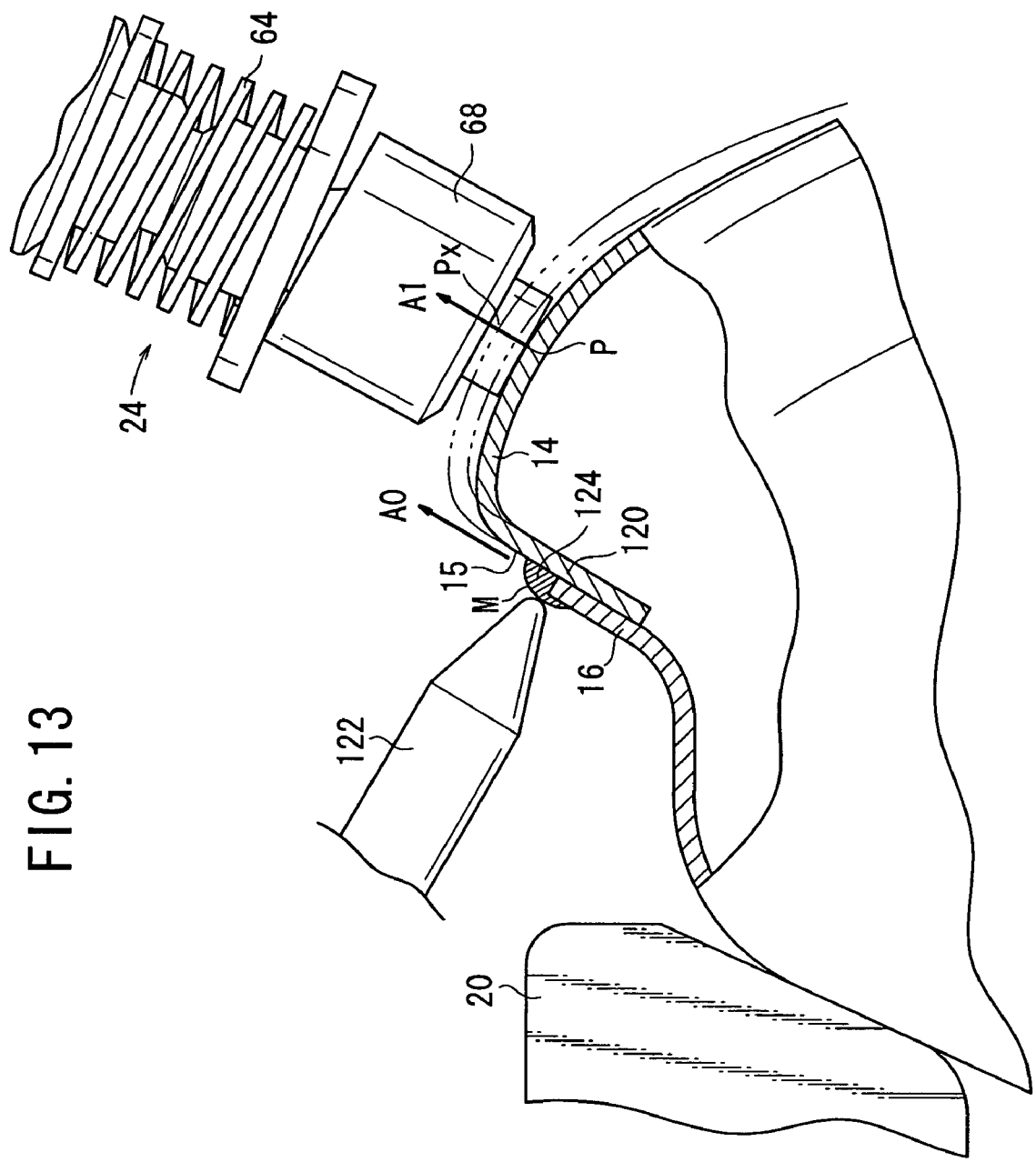
FIG. 13 is a schematic view showing the manner in which the outer side panel is welded while it is being pressed by an attachment.
Figure 14:
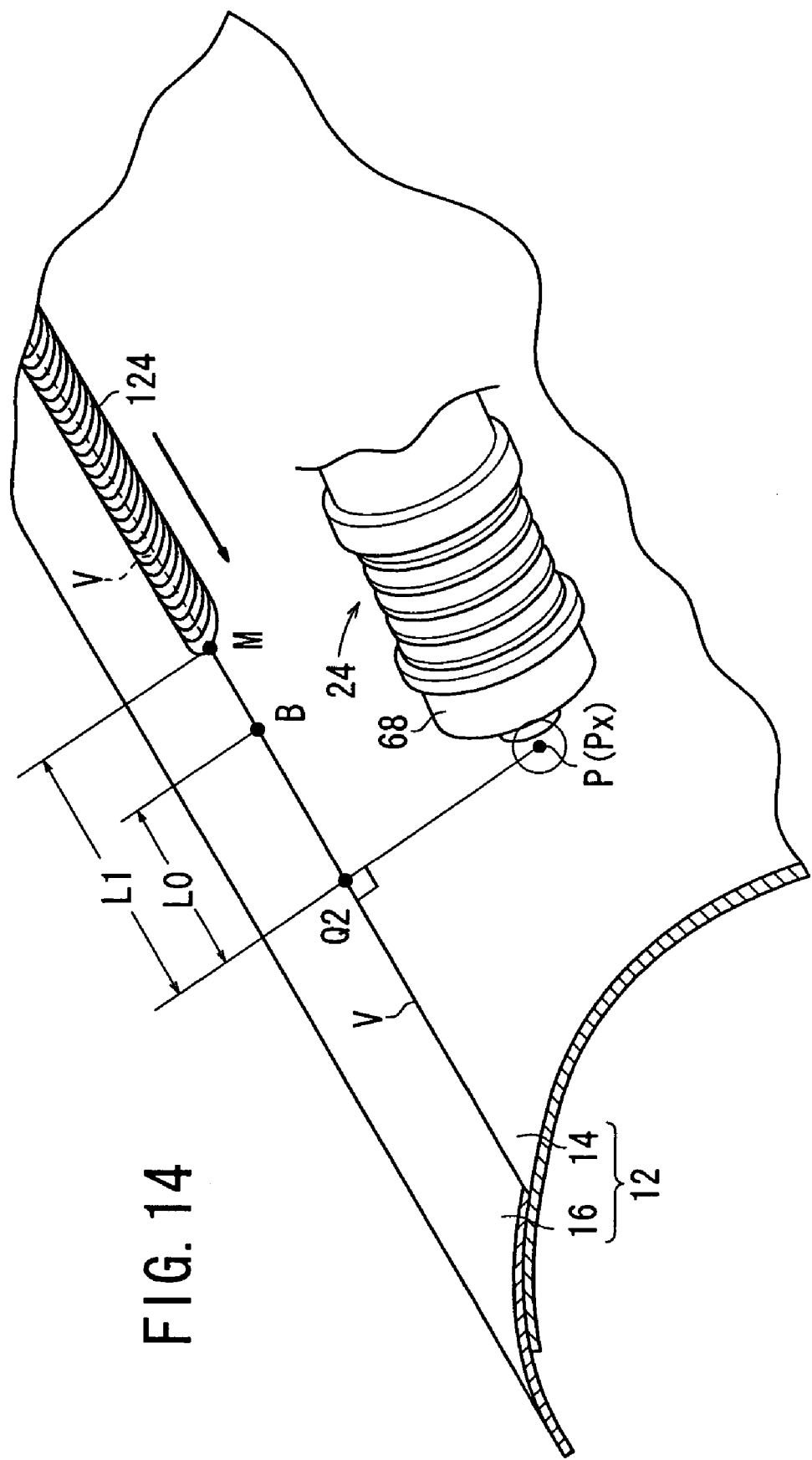
FIG. 14 is a schematic view showing a welding line, an abutment point, a reference point, and a welding point.
Figure 15:
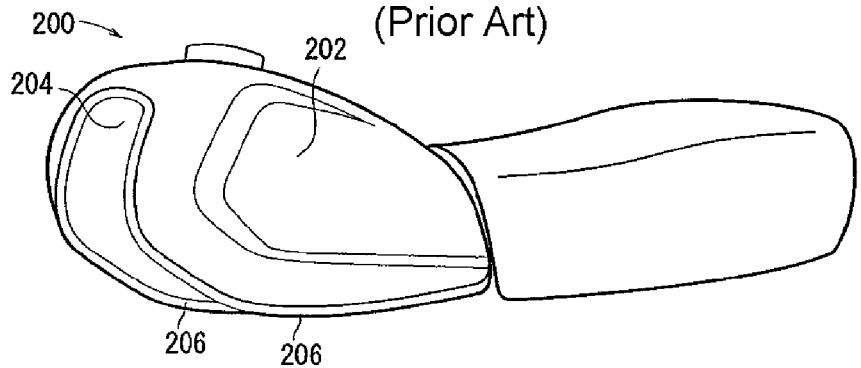
FIG. 15 is a perspective view of a fuel tank having flanges.

In step S7, the welding process is performed along the welding line V. For example, when the welding process is performed from point Q1 toward point Q2, as shown in FIGS. 13 and 14, an electrode 122 (or an arc or the like) is moved along the contact region 120 where the end of the inner side panel 16 contacts the outer side panel 14. Weld beads 124 are formed along the contact region 120, thereby welding the inner side panel 16 and the outer side panel 14 to each other.

As the inner side panel 16 and the outer side panel 14 are welded to each other, a welded region M is melted at a high temperature and hence becomes deformed. If the workpiece is overly restrained during welding, then when the melted region is cooled and solidified, such deformation is not relieved, but rather causes the weld beads 124 to become strained (i.e., thermally strained) therein, and such thermally strained weld beads 124 may possibly become cracked.

According to the welding process performed using the welding jig 10a, when the weld beads 124 are formed due to heat and the welded region is expanded, the outer side panel 14 is deformed and pushed outwardly, as indicated by the arrow A0 (see FIG. 13). At this time, the abutment point P, which is held in attachment against the abutment 68 of the attachment 24, undergoes a force A1 depending on the arrow A0. More specifically, the force A1 is determined depending on the direction and size of the arrow A0, as well as the position of the abutment point P, and is oriented substantially outwardly.

The abutment point P causes the abutment 68 to compress the spring 64 under the force A1. When the force A1 is small, the compression of the spring 64 is small, and when the force A1 is large, the compression of the spring 64 is large.

The initial abutment point P can be displaced to a position Px, where the repulsive force of the compressed spring 64 and the force A1 are held in equilibrium. Therefore, the attachment 24 functions to allow the welded beads 124 to shrink, while absorbing the thermal strain at a high temperature, after the inner side panel 16 and the outer side panel 14 have been welded to each other. Thus, any thermal strain exerted within the welded beads 124 after they are cooled is very small.

Inasmuch as the distance between the abutment point P and the position Px is very small, such a distance will not appear as a dimensional error.

In FIG. 13, arrow A0 represents the direction in which the welded region is expended due to the formation of weld beads 124, wherein the arrow is illustrated as being substantially aligned with the surface of the end of the outer side panel 14. However, thermal strain may be absorbed without regard to the direction in which the arrow A0 is oriented. For example, if the arrow A0 is directed outwardly, then the spring 64 of the attachment 24 will be compressed, depending on the direction and size thereof, in order to absorb the thermal strain.

If the arrow A0 is directed inwardly, then weld beads 124 are formed while shrinking, and the attachment 24 does not restrain the shrinking deformation of the weld beads 124.

In step S7, the welding point determining unit 154 determines a welded spot M (see FIG. 14), where the welding process takes place, from data supplied from the welding robot control unit 130 and the jig robot control unit 132.

In step S8, the welding point determining unit 154 calculates a distance L1 between the position of the welded spot M and a reference point (e.g., point Q2), and compares the distance L1 with a preset distance L0. If the distance L0 is smaller than the distance L1, then control returns to step S7 to continue the welding process. If the distance L0 is greater than the distance L1, e.g., if the welded spot M in FIG. 14 goes beyond a point B which is spaced from point Q2 by the distance L0, then control goes to step S9.

In step S9, the welding point determining unit 154 instructs the cylinder 28 of a corresponding opening/closing mechanism 47 to open the clamp arm 26, spacing the attachment 24 away from the fuel tank 12. For example, when the welding process is performed toward point Q2 shown in FIG. 12, the welding point determining unit 154 instructs the first cylinder control unit 136 (see FIG. 10), which controls the cylinder 28 corresponding to point Q2, to open only the attachment 24 corresponding to point Q2.

While the outer side panel 14 is held by the attachments 24, thermal strain can be absorbed by the springs 64. However, repulsive forces of the springs 64 do exert certain restraint forces, which tend to develop a weak thermal strain depending thereon. By contrast, in step S9, since the attachment 24 is spaced from the outer side panel 14, no restraint forces are applied to the outer side panel 14, further preventing thermal strain from being produced.

If the attachment 24 is spaced from the outer side panel 14 too early, then it fails to perform its function to hold the outer side panel 14. Consequently, the distance L0 needs to be set to a suitable value. Actually, the distance L0 should preferably be set to a value that is equal to or smaller than 20 mm. If the distance L0 is set to 20 mm, then when the welded spot M reaches a point that is spaced from point Q2 by the distance L0 of 20 mm and the attachment 24 is spaced from the outer side panel 14, a location which is spaced about 25 mm from point Q2 has already been welded and substantially solidified. Therefore, even when the attachment 24 is spaced from the outer side panel 14, the outer side panel 14 is not unduly displaced out of position. Since the attachment 24 is spaced from the outer side panel 14 only at the location where the welding process has essentially been completed, the fuel tank 12 is not held laterally out of balance.

In step S10, it is determined whether the welded point M has reached point Q6 or not. If the welded point M has reached point Q6, then the welding process is interrupted and goes to point Q7 in step S11. Then, control goes back to step S6, and the welding process is resumed from point Q7 toward point Q12.

In step S12, it is determined whether the welded point M has reached point Q12 or not. If the welded point M has not reached point Q12, then control goes back to step S7. If the welded point M has reached point Q12, then control goes to step S13.

In step S13, the welding process is ended. After the welding process is ended, the operator releases the joint levers 108, and removes the inner jig 20. The rods 28b of the cylinders 28 are contracted, opening the clamp arms 26. The rod 90 of the positioning mechanism 44 is lifted, and the welded fuel tank 12 is removed in step S14.

In steps S7 and S8, the positional relationship between the welded spot M and the reference point (e.g., point Q2) is determined in real time. However, the reference point may be related to an attitude of the welding robot 10c in advance, and when the welding robot 10c assumes a predetermined attitude, the attachment 24 may be spaced from the outer side panel 14. Alternatively, the welding process may be timed from its start, and the attachments 24 may progressively be operated after predetermined periods of time.

According to the present embodiment, as described above, at high temperatures during and after the welding process, deformation of the welded beads 124 due to thermal strain is absorbed by the springs 64 of the attachments 24. Therefore, essentially no thermal strain is present in the weld beads 124 after they are cooled. Consequently, the weld beads 124 are prevented from cracking, resulting in an increased yield.

Since the attachments 24 can be opened and closed by the clamp arms 26, the fuel tank 12 as a workpiece can easily be attached and detached. Further, the position of the clamp arms 26 can accurately be determined by the stoppers 26b.

The force with which the abutments, as distal ends of the attachments 24, press the outer side panel 14 can be adjusted by the adjustment nuts 60 and the knobs 82.

Since the outer jig 18 comprises a positioning mechanism 44 that is inserted and fixed in the fuel inlet 36 of the fuel tank 12, the fuel tank 12 can quickly and accurately be positioned with respect to the outer jig 18. The inner jig 20 also is able to position the inner side panel 16 of the fuel tank 12 accurately with respect to the outer side panel 14.

According to the present embodiment, furthermore, when the welded spot M moves along the welding line V, the attachments 24 are progressively spaced from the fuel tank 12 in the order in which they are approached by the welded spot M. Therefore, restraint forces on the outer side panel 14 of the fuel tank 12 are eliminated, reducing effects of thermal strain caused by welding, and preventing the fuel tank 12 from cracking. As a result, fuel tanks 12 can be manufactured with an increased yield.

Since the attachments 24 hold the fuel tank 12 with springs 64, the effects of thermal strain caused by welding can be reduced even while the attachments 24 are holding the fuel tank 12.

Because the outer surface of the end of the outer side panel 14 and the inner surface of the end of the inner side panel 16 are superposed and held by the attachments 24 while they are being welded, the welded fuel tank 12 is free of flanges. Therefore, the fuel tank 12 can appropriately be used as the fuel tank for an American-type motorcycle that needs to be aesthetically pleasing.

The welding jig 10a described above comprises eight clamp arms 26. However, the number of clamp arms 26 may be increased or reduced depending on the size and shape of the fuel tank 12. For example, a fuel tank may have a total of four clamp arms 26, two each, provided in left and right symmetrical arrays. The number of attachments 24 mounted on a single clamp arm 26 may also be increased or reduced depending on the size and shape of the fuel tank 12.

The welding method, the welding system, and the welding jig according to the present invention are not limited to the above embodiment, but may have various arrangements and steps without departing from the scope of the invention.

The invention claimed is:

1. A welding method for welding a motorcycle fuel tank, using a plurality of opening/closing mechanisms having one or more attachments, for bringing the attachments into and out of abutting engagement with the fuel tank, comprising the steps of:
bringing the attachments into abutting engagement with the fuel tank by operating said opening/closing mechanisms, thereby holding said fuel tank; and
sequentially bringing the attachments out of abutting engagement with the fuel tank by operating said opening/closing mechanisms, in an order in which the attachments are approached by a welded spot where the fuel tank is welded, as said welded spot moves along a welding line.

2. A welding method according to claim 1, wherein said attachments hold said fuel tank through resilient bodies.

3. A welding method according to claim 1, wherein said fuel tank comprises:
an outer side panel having inwardly extended ends; and
an inner side panel welded to said outer side panel,
wherein said attachments hold said fuel tank while outer surfaces of the ends of said outer side panel and inner surfaces of ends of said inner side panel are superposed, or while the ends of said outer side panel and the ends of said inner side panel are in abutment against each other.

4. A welding method according to claim 1, wherein said attachments are brought out of abutting engagement with said fuel tank by said opening/closing mechanisms, when said welded spot reaches a point spaced 20 mm or less from a reference point on said welding line, which is closest to an abutment point where each of said attachments and said fuel tank abut against each other.

5. A welding method according to claim 1, wherein when a relative position of said welded spot with respect to each of said attachments satisfies a predetermined standard, then a corresponding one of said opening/closing mechanisms is operated to bring said attachment out of abutting engagement with said fuel tank.

6. A welding method according to claim 1, wherein said fuel tank is a seamless fuel tank.

7. A welding method according to claim 1, wherein said attachments are mounted on respective arms associated with said opening/closing mechanisms; and
when said arms are fully opened, said arms are opened wide enough to allow said fuel tank to be attached and detached, and when said arms are fully closed, said arms are positioned by respective stoppers to hold said fuel tank with said attachments.

8. A welding method according to claim 1, wherein said attachments are provided in a jig for supporting an outer side panel of said fuel tank; and
said method includes the further step of inserting a positioning mechanism in a fuel inlet defined in an upper surface of said fuel tank, and contacting an inner portion of said fuel tank with the positioning mechanism to hold said fuel tank.

9. A method of forming a motorcycle fuel tank from an outer side panel, having an inwardly extended inner end, and an inner side panel having an outwardly extended outer end, said method comprising the steps of:
bringing a plurality of opening/closing mechanisms having a plurality of attachments thereon into abutting engagement with said outer side panel to hold said outer side panel, wherein each of said attachments comprises a resilient member;
inserting a positioning mechanism in an opening defined in a surface of said inner side panel, and contacting said inner side panel with the positioning mechanism to hold said inner side panel against said outer side panel such that the inner end of said outer side panel and the outer end of said inner side panel are aligned with one another to define an interface;
using an automated welding machine, welding the inner end of said outer side panel to the outer end of said inner side panel at a welded spot to form a fuel tank, and moving said welded spot along the interface between said inner and outer side panels while monitoring a present position of said welded spot;
determining the present position of said welded spot in relation to respective positions of said attachments, and when a relative position of said welded spot with respect to a position of an individual one of said attachments satisfies a predetermined standard, controlling a corresponding one of said opening/closing mechanisms to bring said individual one of said attachments out of abutting engagement with said fuel tank.

10. A welding method according to claim 9, wherein said attachments are mounted on respective arms associated with said opening/closing mechanisms; and
when said arms are fully opened, said arms are opened wide enough to allow said fuel tank to be attached and detached, and when said arms are fully closed, said arms are positioned by respective stoppers to hold said fuel tank with said attachments.

* * * * *